No. 608,363. Patented Aug. 2, 1898.
G. EICHELBAUM.
PROCESS OF MAKING ADHESIVES.
(Application filed Dec. 23, 1897.)
(No Model.)
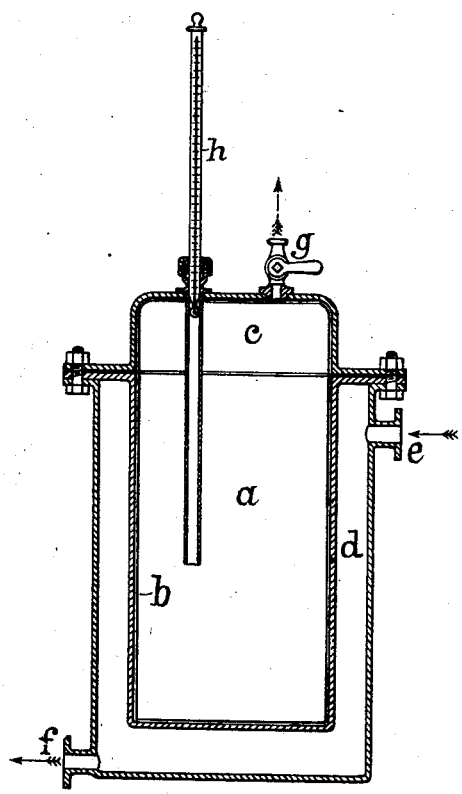
Witnesses:
Geo. T. Pinckney
E. E. Pohle
Inventor:
Georg Eichelbaum
per L. W. Serrell & Son
Attys.

UNITED STATES PATENT OFFICE.

GEORG EICHELBAUM, OF KÖNIGSBERG, GERMANY, ASSIGNOR TO FRIEDRICH HORNIG, OF TAUCHA, GERMANY.

PROCESS OF MAKING ADHESIVES.

SPECIFICATION forming part of Letters Patent No. 608,363, dated August 2, 1898.

Application filed December 23, 1897. Serial No. 663,224. (No specimens.)

*To all whom it may concern:*

Be it known that I, GEORG EICHELBAUM, a subject of the King of Prussia, Emperor of Germany, residing at Königsberg, in the Kingdom of Prussia, German Empire, have invented certain new and useful Improvements in Processes of Manufacturing a Glutinous Substance from Lixiviated Beet-Root Chips, of which the following is a specification.

This invention refers to a process for manufacturing a glutinous substance from lixiviated beet-root chips.

In carrying out this process I proceed as follows: The beet-root chips from which the saccharine matter has been extracted by lixiviation are mixed with a watery solution of sulfurous acid, (thirty to thirty-five grams to one liter,) and this mixture is heated at 80° to 90° Celsius in a closed vessel lined with lead for a period of four to five hours. The pulpy matter resulting from such heating, after the sulfurous acid has been blown off as far as possible, is subjected to pressure. Instead of the watery solution of sulfurous acid the watery solution of bisulfite of alkalies or earth alkalies may be employed in a proportion that corresponds approximately to the above-stated strength of the reacting liquid with free sulfurous acid. The pressed-off liquid is titrated on sulfurous acid, thereafter neutralized by means of chalk, and a small excess of carbonate of lime is added until no effervescence takes place while the liquid is in a warm state. Thus the acid calcium salt of the arabin acid has been formed. The arabin acid is contained in insoluble form as pektin body in the chips and is converted by the sulfurous acid, which causes hydrolysis, into the soluble arabin acid. The liquid, weakly acidulous, is now decanted, filtered, and boiled down in a vacuum apparatus.

Example: Upon one kilo of beet-root chips, which may have been dried by the well-known method of Büttner and Meyer, (which method consists in bringing the chips during their passage through an apparatus in constant contact with the gaseous product of a hearth, so that the chips leave the apparatus with about 88° of dry substance,) four liters of watery sulfurous acid (thirty-five grams of such acid to one liter of water) are poured and the chips, with the acid, are heated in a closed vessel, which is lined inside with lead and provided outside with a steam-jacket, at a temperature of 85° Celsius for a period of four to five hours.

In the accompanying drawing I have represented in vertical section an apparatus that may be employed in carrying out my invention.

$a$ is a vessel having an inner lining of lead $b$; $c$, a removable cover for the vessel $a$; $d$, the steam-jacket; $e$, the supply-pipe for the steam, and $f$ the exit for steam and products of condensation.

$g$ represents a tap to allow for the escape of the sulfurous acid after heat has been applied, and $h$ a thermometer for indicating the heat in the vessel $a$.

After stopping the admission of steam into the jacket $d$ the tap $g$ of the still hot vessel $a$ is opened and the greater part of the sulfurous acid will escape. The pulpy mass, when cooled down, is subjected to pressure, and thereafter again lixiviated with hot water and again pressed. The lyes resulting from the repeated pressure action are united, which lyes will already show a superior adhesiveness or viscosity. Thereafter the united lyes are treated with chalk, so as to neutralize the sulfurous acid contained in the lyes. The quantity of chalk to be used will depend upon how long effervescence will take place. As soon as effervescence stops the addition of chalk is stopped. The quantity will be about twenty to twenty-five grams, according to the result in glutinous matter. The liquid is then decanted, filtered, and boiled down in a vacuum apparatus. The result will be about five hundred grams of a glutinous substance the color of which will vary, according to the precaution taken in boiling down, from light yellow to brown. The beet-root chips if afterward dried again will show a decrease in weight of about sixty per cent.

I claim—

The process of manufacturing an adhesive or glutinous substance from lixiviated beet-root chips consisting in treating the chips under pressure with hot watery sulfurous acid or a watery solution of the bisulfites of the alkalies or earth alkalies, whereby the insoluble pektin body contained in the chips is
5 converted into soluble arabin acid, substantially as described.

In testimony that I claim the foregoing as my invention I have signed my name in presence of two subscribing witnesses.

GEORG EICHELBAUM.

Witnesses:
 CARL KNOOP,
 HERNANDO DE SOTO.